United States Patent
Hirakawa

(10) Patent No.: US 8,553,670 B2
(45) Date of Patent: Oct. 8, 2013

(54) RADIO COMMUNICATION DEVICE FOR PERFORMING COMMUNICATION USING THE OFDMA SYSTEM

(75) Inventor: Mitsuru Hirakawa, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 490 days.

(21) Appl. No.: 12/741,786

(22) PCT Filed: Nov. 6, 2008

(86) PCT No.: PCT/JP2008/070200
§ 371 (c)(1),
(2), (4) Date: Aug. 25, 2010

(87) PCT Pub. No.: WO2009/060894
PCT Pub. Date: May 14, 2009

(65) Prior Publication Data
US 2010/0316042 A1 Dec. 16, 2010

(30) Foreign Application Priority Data
Nov. 9, 2007 (JP) .................................. 2007-292114

(51) Int. Cl.
*H04B 7/208* (2006.01)
(52) U.S. Cl.
USPC .......................................................... 370/344
(58) Field of Classification Search
USPC ................................................. 370/328–338
See application file for complete search history.

(56) References Cited

U.S. PATENT DOCUMENTS

| 7,072,693 B2* | 7/2006 | Farlow et al. ............... 455/562.1 |
| 7,738,530 B2* | 6/2010 | Thomas ......................... 375/140 |
| 7,839,822 B2* | 11/2010 | Yang et al. .................... 370/329 |
| 2002/0018517 A1 | 2/2002 | Hara |
| 2008/0181174 A1* | 7/2008 | Cho ............................... 370/329 |
| 2011/0286412 A1* | 11/2011 | Mochida et al. .............. 370/329 |
| 2012/0201221 A1* | 8/2012 | Mochida ....................... 370/329 |

FOREIGN PATENT DOCUMENTS

| JP | 11-289213 | 10/1999 |
| JP | 2002-026787 | 1/2002 |
| JP | 2002-185375 | 6/2002 |
| JP | 2003-174427 | 6/2003 |

(Continued)

OTHER PUBLICATIONS

IEEE 802.16 standard, "Part 16: Air Interface for Broadband Wireless Access Systems," Aug. 2007, U.S.A. pp. 994-997.

(Continued)

*Primary Examiner* — Mark Rinehart
*Assistant Examiner* — Kenneth P Hunt
(74) *Attorney, Agent, or Firm* — McDermott Will & Emery LLP

(57) ABSTRACT

A radio communication device performing radio communication using OFDMA system includes: a SMI weight deriving unit (14) calculating a correlation matrix and a correlation vector using a plurality of received signal vectors as sample values, and deriving a SMI weight based on the calculated correlation matrix and correlation vector; and a weight multiplying unit (15) for multiplying the received signal vector by the SMI weight derived by the SMI weight deriving unit (14). The SMI weight deriving unit (14) uses a received signal vector of each of a plurality of subcarriers included in a user allocated region in the OFDMA system as a sample value, and thereby derives the SMI weight for the user allocated region.

15 Claims, 14 Drawing Sheets

(56) References Cited

FOREIGN PATENT DOCUMENTS

| JP | 2004-343282 | 12/2004 |
|---|---|---|
| JP | 2005-295506 | 10/2005 |
| JP | 2007-259210 | 10/2007 |

OTHER PUBLICATIONS

Nobuyoshi Kikuma, "Adaptive Signal Processing Using Array Antenna," first edition, Kabushiki Kaisha Kagaku Gijutu Shuppan, 1998, pp. 35-66, with Partial English Translation.

S. Kapoor et al. "Adaptive interference suppression in multiuser wireless OFDM systems using antenna arrays," IEEE Transaction on Signal Processing, vol. 47, Issue 12, 1999 pp. 3381-3391.

F.W. Vook et al. Adaptive antennas for OFDM, Vehicular Technology Conference, 1998, VTC 98, 48th IEEE, vol. 1, 1999, pp. 606-610.

Ming Lei et al., Fast-Convergence SMI Adaptive Beamforming Based on Frequency-to-Time Pilot Transform for OFDM System, Wireless Communications, Networking and Mobile Computing, 2006, WiCOM 2006, International Conference on, pp. 1-5.

Takeshi Yamamoto et al., "A Study on Weight Update Method of Adaptive Array Antenna in Mobile WiMax Antenna System," Proceedings of the 2007 IEICE General Conference, Mar. 2007. p. 168, A-5-13.

"Enhancements/Corrections for AAS in OFDMA PHY," IEEE 802.16 Broadband Wireless Access Working Group, pp. 1-14, 2004 <http://ieee802.org/16>.

* cited by examiner

FIG.10

| DATA | CORRELATION MATRIX | CORRELATION VECTOR |
|---|---|---|
| 1 | $R_1 + R_2$ | $r_1 + r_2$ |
| 2 | $R_2 + R_3$ | $r_2 + r_3$ |
| 3 | $R_1 + R_4$ | $r_1 + r_4$ |
| 4 | $R_1 + R_2 + R_4 + R_5$ | $r_1 + r_2 + r_4 + r_5$ |
| 5 | $R_2 + R_3 + R_5 + R_6$ | $r_2 + r_3 + r_5 + r_6$ |
| 6 | $R_3 + R_6$ | $r_3 + r_6$ |
| 7 | $R_4 + R_5$ | $r_4 + r_5$ |
| 8 | $R_5 + R_6$ | $r_5 + r_6$ |

RADIO COMMUNICATION DEVICE FOR PERFORMING COMMUNICATION USING THE OFDMA SYSTEM

RELATED APPLICATIONS

This application is the U.S. National Phase under 35 U.S.C. §371 of International Application No. PCT/JP2008/070200, filed on Nov. 6, 2008, which in turn claims the benefit of Japanese Application No. 2007-292114, filed on Nov. 9, 2007, the disclosures of which Applications are incorporated by reference herein.

TECHNICAL FIELD

The present invention relates to a radio communication device.

BACKGROUND ART

Recently, WiMAX (Worldwide Interoprability for Microwave Access, IEEE802.16), one of radio communication standards of the next generation, has attracting attention. WiMAX is a standard expanding speed of communication and mobility of wireless LAN (Local Area Network) (see IEEE 802.16 standard, "Part 16: AIR INTERFACE FOR BROADBAND WIRELESS ACCESS SYSTEMS" August 2007, US. pp. 994-997 (Non-Patent Document 1)).

WiMAX utilizes OFDMA (Orthogonal Frequency Division Multiple Access).

OFDMA system is an expansion of OFDM (Orthogonal Frequency Division Multiplexing) in which data are spread over a plurality of subcarriers, that is, frequencies, so that the data is frequency-multiplexed, to enable allocation among a plurality of users.

Specifically, in OFDMA system, similar to the OFDM system as its base, a plurality of subcarriers are provided in the direction of frequency axis. Different from OFDM, one frame is allocated to a plurality of users in accordance with the frequency (subcarrier) and time (symbol).

The WiMAX communication system utilizes cell configurations and in each cell, a base station (BS) is provided, for example, on a roof top of a building. A mobile station (MS) selects a base station to communicate with, and communicates with the selected base station.

In the uplink of WiMAX, while the base station receives signals from the mobile station, it is expected that signals from a mobile station communicating with a base station of another cell act as interference signals, that is, signals from a mobile station with which communication of the base station of interest is not intended. Such interference signals deteriorate quality of signals received by the base station and, therefore, it is necessary to remove the interference signals in order to improve quality of received signals.

Adaptive array antenna has been known as a method of removing the interference signals. A plurality of antenna elements of the adaptive array antenna receive signals, and the signals received by respective antenna elements are combined with the amplitude and phase controlled, whereby desired signals are generated.

As a result, the antenna comes to have such directivity that, generally, a strong beam is formed in the direction of a desired signal, that is, a signal from a mobile station with which communication of the base station of interest is desired and a weak or null beam is formed in the direction of an interference signal.

In digital control, the amplitude and phase of signals received by each antenna element can be controlled by complex multiplication. The complex here is referred to as a weight.

ZF (Zero Forcing) and MMSE (Minimum Mean Square Error) have been known as methods of calculating the weight. Both methods calculate the weight utilizing signals known on the receiving side.

ZF method uses a weight calculated on the assumption that "combined output signal=transmitted signal," with noise ignored. Though ZF method exhibits good characteristics in an environment with low noise or weak interference signal, reception quality significantly deteriorates as the interference signal components increase in the received signals.

On the other hand, MMSE uses a weight with which the error power of combined output signal is minimized. The MMSE method has the ability of removing interference signals and, therefore, improves reception quality even when the received signals contain much interference signal components.

Methods of calculation in accordance with MMSE include LMS (Least Mean Square) and RLS (Recursive Least Squared) based on steepest decent method and SMI (Sample Matrix Inversion) as a direct solution using sample values (see Nobuyoshi KIKUMA, "Adaptive Signal Processing Using Array Antenna," first edition, Kabushiki Kaisha Kagaku Gijutu Shuppan, 1998, pp. 35-66 (Non-Patent Document 2)).

A configuration of deriving a weight using LMS algorithm in OFDM system is disclosed in Japanese Patent Laying-Open No. 2003-174427 (Patent Document 1). Patent Document 1: Japanese Patent Laying-Open No. 2003-174427 Non-Patent Document 1: IEEE 802.16 standard, "Part 16: AIR INTERFACE FOR BROADBAND WIRELESS ACCESS SYSTEMS," August 2007, U.S.A., pp. 994-997 Non-Patent Document 2: Nobuyoshi KIKUMA, "Adaptive Signal Processing Using Array Antenna," first edition, Kabushiki Kaisha Kagaku Gijutu Shuppan, 1998, pp. 35-66

DISCLOSURE OF THE INVENTION

Problems to be Solved by the Invention

Generally, in order to derive an appropriate weight, it is necessary that the received signals include a plurality of signals of which amplitude and phase at the time of transmission are known on the receiving side. On the receiving side, it is possible to derive an appropriate weight by, for example, MMSE method, from the received plurality of known signals.

It is noted that conventional methods of deriving a weight are on the assumption that the plurality of known signals included in the received signals are transmitted from one transmitter.

An appropriate weight differs dependent on the channel environment between a transmitter and a receiver and, therefore, if a known signal transmitted from a different transmitter is mixed in the received signals, an appropriate weight cannot be derived.

WiMAX utilizing the OFDMA system described above is for allocation among multiple users and, therefore, known signals (pilot subcarriers) transmitted from different transmitters are mixed in the received signals.

Specifically, in WiMAX utilizing the OFDMA system, pilot subcarriers as known signals are spread over a two-dimensional subcarrier arrangement having a frequency-axis and a time-axis, and these pilot subcarriers are transmitted by different users.

As a result, in WiMAX utilizing the OFDMA system, it follows that a weight must be derived using pilot subcarriers that are known signals transmitted by a plurality of different users and, hence, it is difficult to derive an appropriate weight.

As described above, conventionally, there is no specific knowledge as to how an appropriate weight can be derived, in WiMAX utilizing the OFDMA system for multiple user allocation.

Therefore, an object of the present invention is to provide a radio communication device capable of deriving an appropriate weight in a communication system for mobile WiMAX.

Means for Solving the Problems

According to an aspect, the present invention provides a radio communication device performing radio communication using a communication system in which minimum unit regions for user allocation of radio resource are arranged in frequency axis direction and time axis direction, whereby the radio resource can be shared among a plurality of users, including: a SMI weight deriving unit calculating a correlation matrix and a correlation vector using a plurality of received signal vectors as sample values, and deriving a SMI weight based on the calculated correlation matrix and correlation vector; and a weight multiplying unit for multiplying the received signal vector by the SMI weight derived by the SMI weight deriving unit; wherein the SMI weight deriving unit uses a received signal vector of each of a plurality of subcarriers included in a user allocated region in the above-described communication system as a sample value, and thereby derives the SMI weight for the user allocated region.

Thus, the weight is derived in the user allocated region and, therefore, even in the OFDMA system for multiple user allocation, the weight can appropriately be derived.

Further, in the SMI method, the weight is directly derived from a plurality of sample values. Therefore, as compared with the LMS method in which an appropriate weight is obtained by a number of successive updating processes, more appropriate weight can be obtained even if the weight is derived in the user allocated region.

In the present invention, the user allocated region may be a part of a region allocated to one user, rather than the whole region allocated to one user.

According to another aspect, the present invention provides a radio communication device performing radio communication using a communication system in which minimum unit regions for user allocation of radio resource are arranged in frequency axis direction and time axis direction, whereby the radio resource can be shared among a plurality of users, including: a SMI weight deriving unit calculating a correlation matrix and a correlation vector using a plurality of received signal vectors as sample values, and deriving a SMI weight based on the calculated correlation matrix and correlation vector; and a weight multiplying unit for multiplying the received signal vector by the SMI weight derived by the SMI weight deriving unit; wherein the SMI weight deriving unit uses a received signal vector of each of a plurality of subcarriers included in a minimum unit region for user allocation of radio resource as a sample value, and thereby derives the SMI weight for the minimum unit region.

As described above, when the weight is derived in the minimum unit region for user allocation of radio resource, it is ensured that the user is the same in the minimum unit region. Therefore, even when the user allocation information is not obtained, derivation of a weight based erroneously on a plurality of users can be prevented.

The weight derived here may be a weight common in the minimum unit region, or weights different subcarrier by subcarrier in the minimum unit region.

More preferably, subcarrier arrangement in the above-described communication system is a two-dimensional arrangement in frequency axis direction and time axis direction; and each of minimum unit regions is allocated to a user different from a user allocated to another minimum unit region neighboring in the frequency axis direction and different from a user allocated to another minimum unit region neighboring in the time axis direction.

In such a case, adjacent minimum unit regions are allocated to different users. Therefore, if the weight is derived in a scope larger than the minimum unit region, it follows that the weight is derived based on a plurality of users. Since the weight is derived in the minimum unit region, such a problem can be avoided.

Preferably, the minimum unit region is a tile of UL PUSC (Partial Usage of Sub Channels) of WiMAX.

Preferably, the SMI weight deriving unit includes a diagonal matrix adding unit adding a diagonal matrix whose diagonal component is a positive number to the calculated correlation matrix; and the SMI weight deriving unit derives the SMI weight based on the correlation matrix having the diagonal matrix added.

When the SMI weight is derived using the correlation matrix, inverse matrix calculation of the correlation matrix is necessary. By adding a positive diagonal matrix to the correlation matrix, the value of correlation matrix can be made to have a certain value or larger. Thus, an overflow in calculation can be avoided and the calculation is stabilized.

Preferably, the sample value includes a received signal vector of a pilot subcarrier included in the minimum unit region.

Preferably, the SMI weight deriving unit includes a channel estimating unit for calculating a channel estimation value of a data subcarrier included in the minimum unit region, based on a pilot subcarrier included in the minimum unit region; and the SMI weight deriving unit generates the received signal vector of the data subcarrier based on the channel estimation value calculated by the channel estimating unit, and derives the SMI weight based on a sample value including the generated received signal vector of the data subcarrier.

Here, a received signal vector of data subcarrier can also be used and, therefore, it becomes easier to increase the number of sample values.

More preferably, the SMI weight deriving unit derives the SMI weight, using a received signal vector of a pilot subcarrier included in the minimum unit region, and the received signal vector, which is generated based on the channel estimation value, of data subcarrier, as the sample values.

Since the received signal vectors of both pilot and data subcarriers are utilized, the number of sample values increases.

More preferably, the SMI weight deriving unit derives a SMI weight for each data subcarrier included in the minimum unit region.

Here, a SMI weight for each data subcarrier can be obtained.

More preferably, the SMI weight deriving unit includes a correlation matrix calculating unit, regarding the minimum unit region as a set of a plurality of small regions partially overlapping with each other, for calculating the correlation matrix for each small region, using a received signal vector of a pilot subcarrier or a received signal vector of a data subcarrier included in the small region as a sample value; and the SMI weight deriving unit derives the SMI weight based on the correlation matrix or matrixes corresponding to one or a plurality of the small regions to which a data subcarrier of which SMI weight is to be derived belongs, among the correlation matrixes of respective ones of the small regions calculated by the correlation matrix calculating unit.

Here, the small region used for deriving the weight differs data subcarrier by data subcarrier and, therefore, it becomes possible to derive an appropriate weight.

More preferably, the SMI weight deriving unit includes a correlation vector calculating unit, regarding the minimum unit region as a set of a plurality of small regions partially overlapping with each other, for calculating the correlation vector for each small region, using a received signal vector of a pilot subcarrier or a received signal vector of a data subcarrier included in the small region as a sample value; and the SMI weight deriving unit derives the SMI weight based on the correlation vector or vectors corresponding to one or a plurality of the small regions to which a data subcarrier of which SMI weight is to be derived belongs, among the correlation vectors of respective ones of the small regions calculated by the correlation vector calculating unit.

Here again, the small region used for deriving the weight differs data subcarrier by subcarrier and, therefore, it becomes possible to derive an appropriate weight.

Effects of the Invention

According to the present invention, an appropriate weight can be derived.

BRIEF DESCRIPTION OF THE DRAWINGS

FIG. 10 shows a correspondence table.

DESCRIPTION OF THE REFERENCE SIGNS

Figure 1:
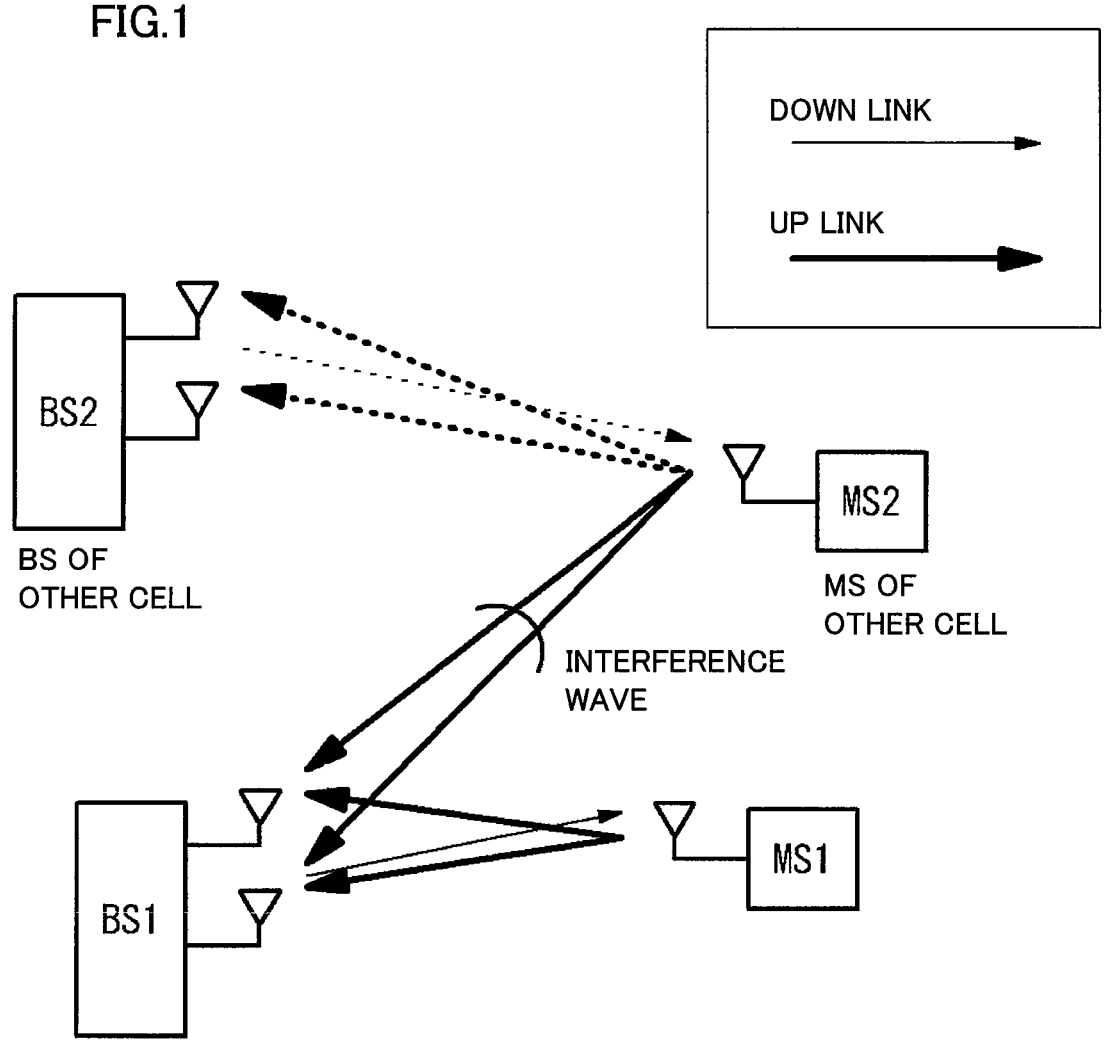
FIG. 1 shows a WiMAX communication system.

1: receiving unit, 11a, 11b: antenna element, 12a, 12b: pre-processing unit, 13a, 13b: CP removing & DFT unit, 14: SMI weight deriving unit, 15: weight multiplying & combining unit (weight multiplying unit), 16: demodulating unit.

BEST MODES FOR CARRYING OUT THE INVENTION

In the following, embodiments of the present invention will be described with reference to the figures. In the figures, the same or corresponding portions are denoted by the same reference characters and description thereof will not be repeated. Though WiMAX system utilizing OFDMA system will be described as an exemplary communication system in the embodiments, it is not limiting.

FIG. 1 shows a communication system of WiMAX. As shown in FIG. 1, a plurality of base stations BS1 and BS2 are provided, and the base stations (base station communication devices) BS1 and BS2 are provided one for each cell. Each of the base stations BS1 and BS2 communicates with mobile stations (user radio communication devices) MS1 and MS2 in the cells. Each base station BS1 or BS2 is capable of simultaneous communication with a plurality of mobile stations in the cell.

In a WiMAX uplink, base station BS1 receives a signal from mobile station MS1. A signal from mobile station MS2 communicating with a base station BS2 of another cell becomes the interference signal. In order to remove the interference signal, a process of deriving a weight is performed in base station BS1 (details will be described later).

Further, OFDMA system as one type of frequency multiplex methods is an expansion of OFDM, introducing a concept of logical sub channels formed by sub sets each including a subcarrier, to improve flexibility of radio resource allocation to user data. OFDM is a communication method in which a number of subcarriers orthogonally arranged on the frequency axis are subjected to modulation such as QAM (Quadrature Amplitude Modulation), thereby to transmit digital information.

The subcarriers of OFDMA system include three types of subcarriers, that is, data subcarrier, pilot subcarrier and null subcarrier.

Data subcarrier (data signal) is a subcarrier for transmitting data and a controlling message. Pilot subcarrier is a subcarrier for transmitting a known signal (pilot signal) on the receiving and transmitting sides.

Null subcarrier is a subcarrier actually transmitting nothing, formed of a guard sub band (guard subcarrier) on the low frequency side, a guard sub band (guard subcarrier) on the high frequency side and a DC subcarrier (central frequency subcarrier). For simplicity of description, in the following, null subcarrier is not considered.

Figure 2:
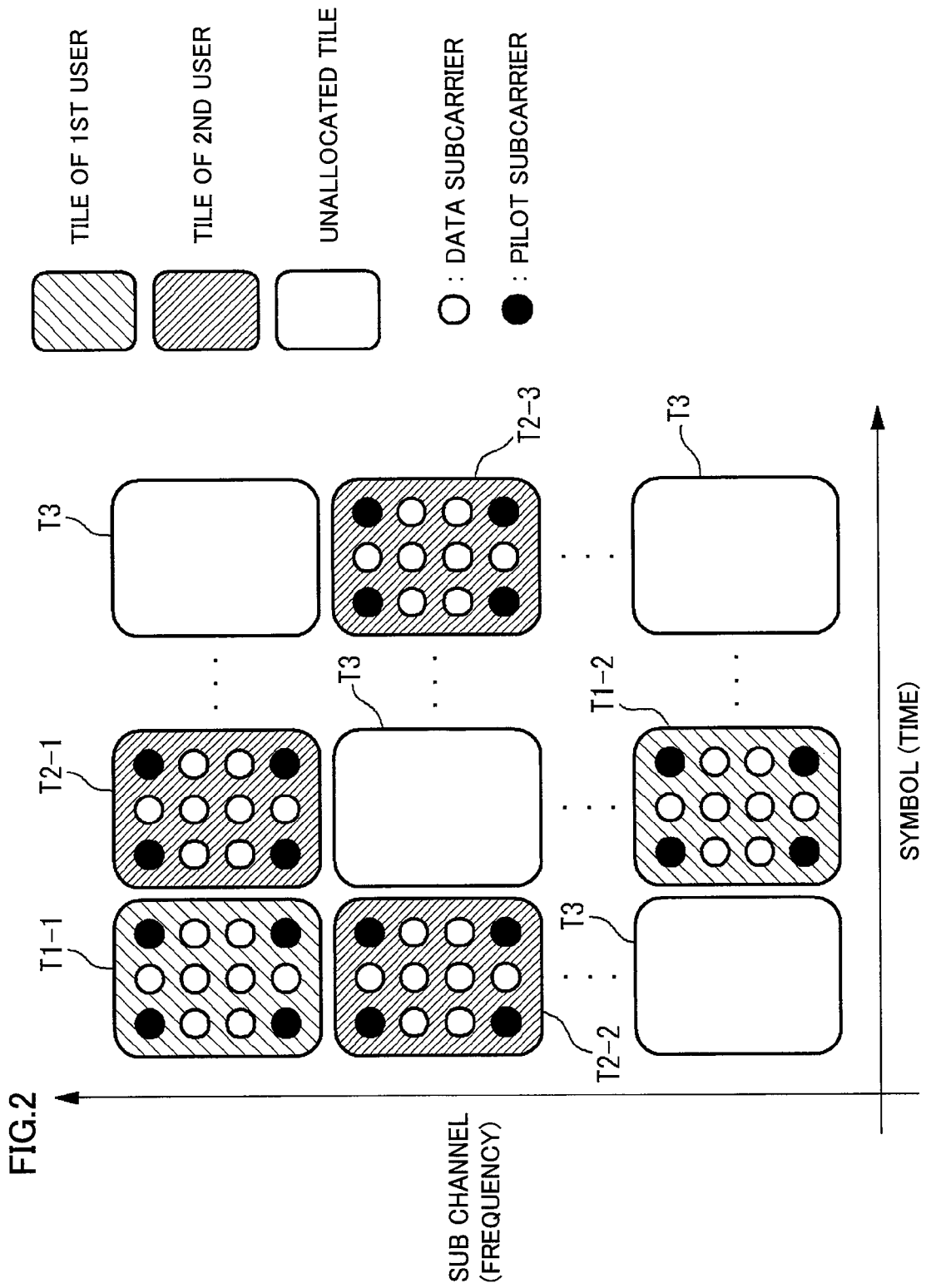
FIG. 2 shows a two-dimensional arrangement of UL PUSC subcarriers in WiMAX.

FIG. 2 shows two-dimensional arrangement of data subcarriers and pilot subcarriers of UL PUSC in OFDMA system. In FIG. 2, the abscissa represents time (symbol) axis and the ordinate represents a frequency (sub-channel) axis.

In the UL PUSC shown in FIG. 2, one sub set includes a total of twelve subcarriers, that is, (three in time axis direction)×(four in frequency axis direction). The sub sets form tiles T1, T2, and T3, respectively. Tiles T1, T2 and T3 each represent a region as a minimum unit for user allocation.

At four corners of each of tiles T1, T2 and T3, pilot subcarriers (black circles in FIG. 2) are arranged. Other subcarriers in tiles T1, T2 and T3 are data subcarriers (white circles in FIG. 2).

As shown in FIG. 2, tiles T1, T2 and T3 are regularly arranged in the directions of time axis and frequency axis.

Figure 3:
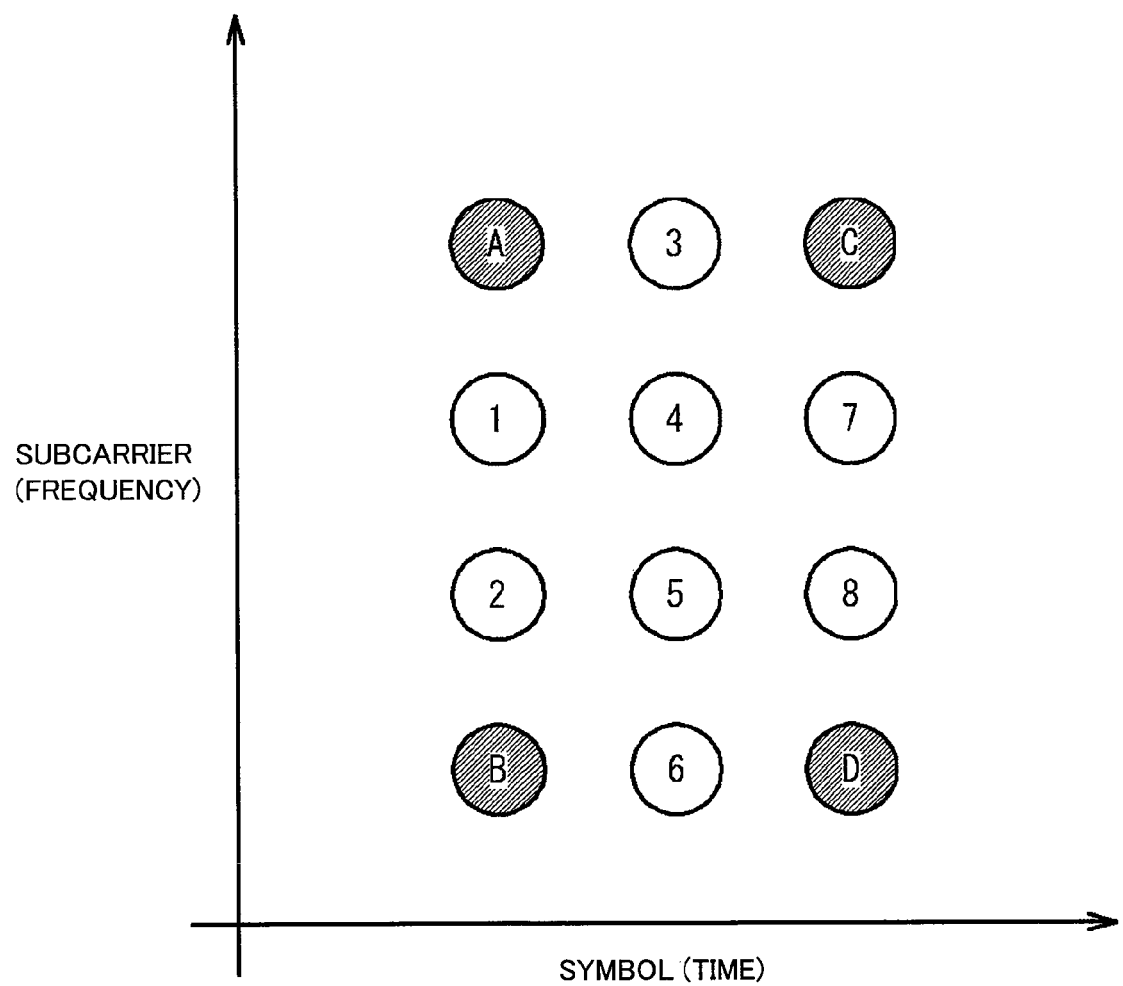
FIG. 3 shows tile structures.

FIG. 3 shows a tile structure.

In the following, for convenience of description, four pilot subcarriers in one tile are represented as "A, B, C and D," and 8-data subcarriers in one tile will be represented by "1, 2, 3, 5, 6, 7 and 8," respectively.

As described above, in OFDMA system, an up sub-frame as one communication frame is allocated to a plurality of users, whereby radio resource can be shared among the plurality of users.

The user allocation of an uplink in OFDMA system is on tile-by-tile basis. A region obtained by combining a plurality of tiles is allocated as a burst region to individual user.

The plurality of tiles forming the burst region allocated to one user may be combined in various manners. Here, as shown in FIG. 2, it is assumed that each tile is allocated to a user different from the user corresponding to a tile adjacent in the direction of the frequency axis and different from the user corresponding to a tile adjacent in the direction of the time axis.

Specifically, in the example of FIG. 2, a tile adjacent in the direction of time axis is a tile of a different user. By way of example, a tile T1-1 corresponds to a first user and a tile T2-1 corresponds to a second user. Further, a tile adjacent in the direction of frequency axis is also a tile of a different user. By way of example, a tile T1-1 corresponds to a first user and a tile T2-2 corresponds to a second user. When such user allocation takes place and the conventional method of deriving a weight is applied as it is, an appropriate weight cannot be obtained.

Figure 4:
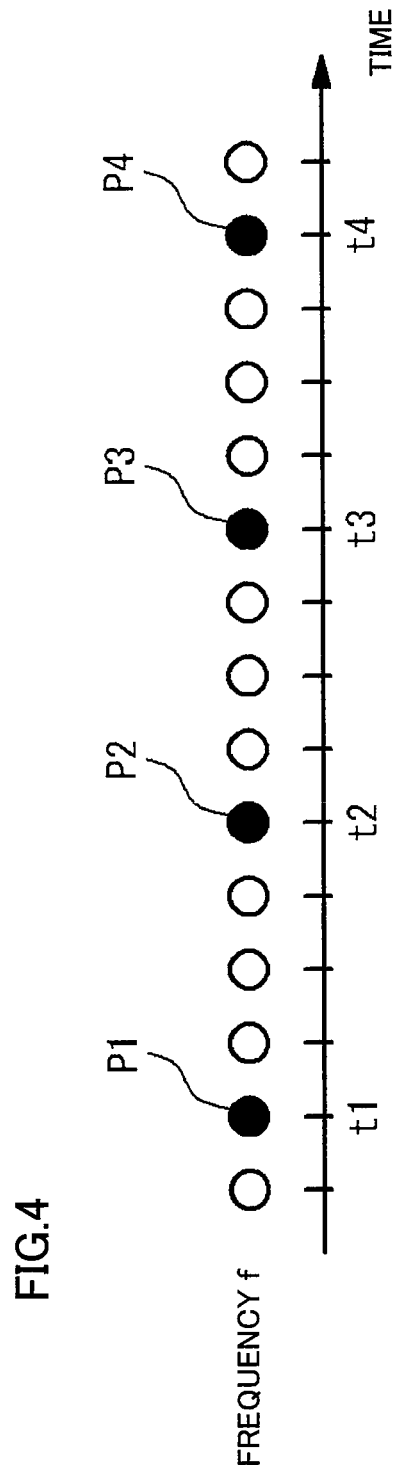
FIG. 4 shows pilot signals of the same frequency aligned on a time axis.

FIG. 4 shows pilot signals of the same frequency aligned on the time axis.

Conventionally, in OFDM system used, for example, in terrestrial digital broadcasting, allocation among a plurality of users is not done. In order to derive a weight, a plurality of pilot subcarriers P1, P2, P3, P4, . . . aligned on the time axis of a frequency f (subcarrier) as shown in FIG. 4 have been used. The reason why pilot subcarriers P1, P2, P3, P4, . . . of the same frequency are used is that if the frequency is different, channel characteristics are also different and hence, optimal weight is also considered to be different.

Assume, for example, that the weight is calculated in accordance with LMS algorithm, using these pilot subcarriers P1, P2, P3, P4, . . . . Here, the weight is updated first by using pilot subcarrier P1, and thereafter, the weight is successively updated using pilot subcarriers P2, P3, P4 . . . in this order, that is, in the order of time (see, for example, Patent Document 1). By updating the weight a number of times, the weight is converged to the optimal value.

Further, other than the LMS algorithm, if SMI method and RLS method are simply applied to the OFDMA system, it follows that the weight is derived using the plurality of pilot subcarriers P1, P2, P3, P4, . . . aligned in the direction of the time axis of the same frequency.

If the conventional method of deriving a weight using a plurality of pilot subcarriers P1, P2, P3, P4, . . . arranged on the direction of the time axis of the same frequency is used and the data of different users are allocated in the direction of time axis, it follows that the weight is derived using pilot subcarriers transmitted from different users and, hence, an appropriate weight cannot be obtained.

Particularly if the communication system such as shown in FIG. 2, in which tiles adjacent in the direction of time axis are always allocated to different users, is used, base station BS1 can receive only two pilot subcarriers at most from the same user in the direction of the time axis. Therefore, if LMS algorithm is applied to OFDMA system, the user is switched before the derived weight value converges, and the appropriate weight cannot be obtained.

Therefore, in the present embodiment, in order to derive a weight, not only the plurality of pilot subcarriers P1, P2, P3, P4, . . . arranged in the direction of time axis of the same frequency but also some or all of pilot subcarriers included in the whole region or part of the region allocated to the user are used to derive the weight for the data subcarriers included in the whole region or part of the region allocated to the user.

In one user allocated region, the user that transmitted the pilot subcarriers is one same user. Therefore, by obtaining pilot subcarriers used for deriving a weight from one user allocated region, it becomes possible to derive a weight appropriately even in the communication system that involves multiple user allocation.

In the embodiments below (Embodiment 1 to Embodiment 5), as an example of using pilot subcarriers included in a part of the user allocated region, a method of using sub-carries included in a tile region as a minimum unit of user allocation will be described.

If the weight is to be derived on the tile-by-tile basis as in the embodiments below, not only the plurality of pilot subcarriers arranged in the direction of the time axis of the same frequency but also pilot subcarriers at different positions in the direction of frequency axis, such as pilot subcarriers A and B or C and D shown in FIG. 3 are also used for weight derivation.

Generally, when the frequency is different, the optimal value of weight is also different. Therefore, use of received signals of different frequencies is considered not good for deriving a weight. The frequency difference in a tile, however, is so small that it poses no serious problem.

In mobile communication in accordance with WiMAX, for example, if the mobile station MS moves at a high speed, the channel changes considerably with time and hence, the value of optimal weight also changes at high speed, even if the subcarriers are of the same frequency. In that case, variation of optimal weight is smaller if a plurality of received signals arranged in the direction of frequency axis of the same time are used, rather than a plurality of received signals arranged in the direction of time axis of the same frequency and, therefore, the weight can be derived more appropriately.

Therefore, in the present embodiment, received signals, that is, subcarriers of different frequencies, are positively used for deriving a weight. Conventionally, there is no idea of deriving a weight using not a single subcarrier in the direction of frequency axis but a plurality of subcarriers aligned in the direction of frequency axis. In the embodiments, however, the weight is derived using a region extending both in the direction of frequency axis and in the direction of time axis, that is, the tile region as the minimum unit region for user allocation, as a unit.

It is noted that, if the weight is derived on the tile-by-tile basis, even if the pilot subcarriers are at different positions in the direction of frequency axis as in the case of pilot subcarriers A and B or C and D shown in FIG. 3, the frequency difference is as small as a few subcarriers. Therefore, the influence of frequency difference is insignificant. On the other hand, since a large number of pilot subcarriers can be used, it becomes possible to derive an appropriate weight.

Embodiment 1

Figure 5:
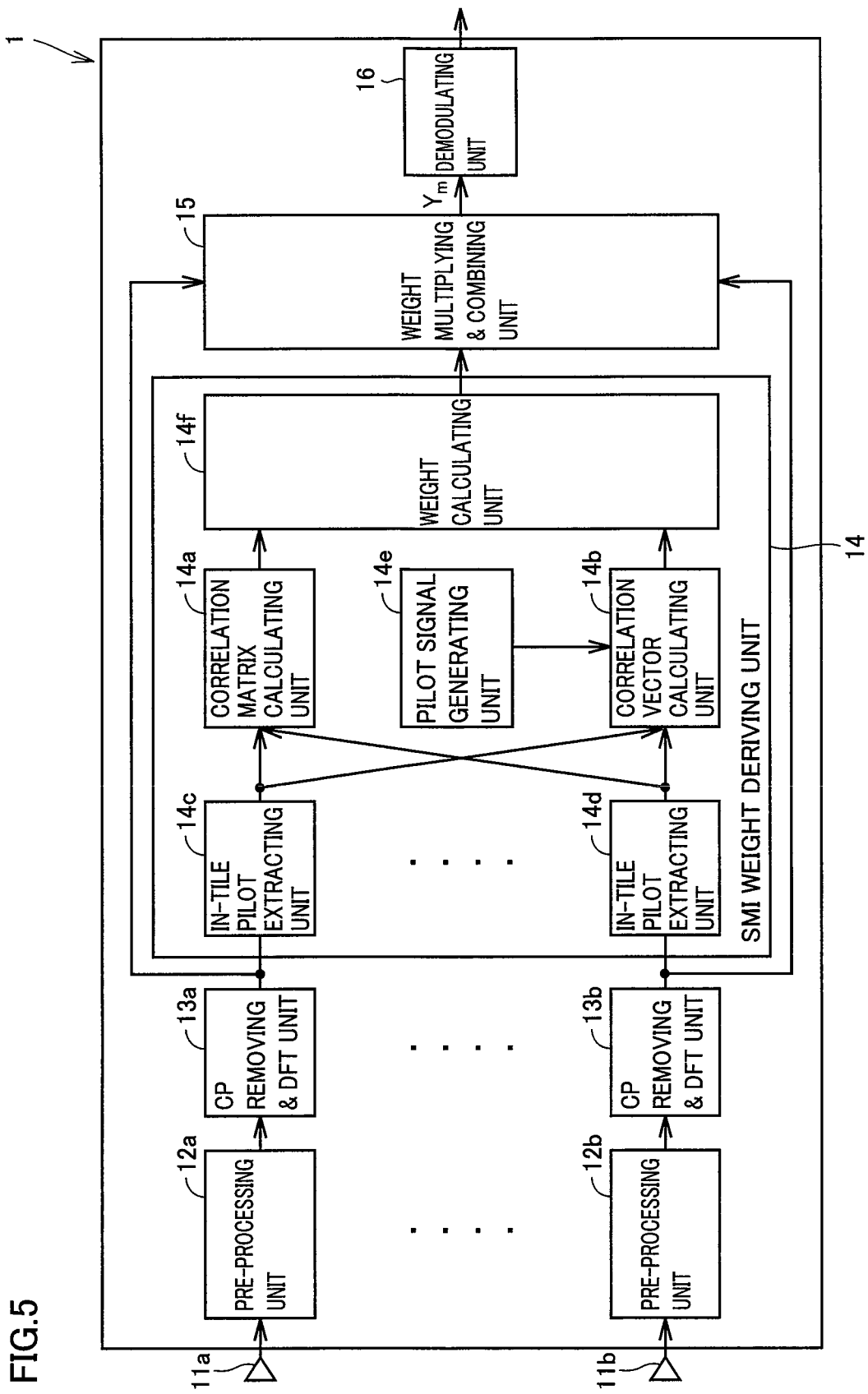
FIG. 5 is a block diagram of a receiving unit of a base station communication device in accordance with Embodiment 1.

FIG. 5 shows a configuration of a receiving unit 1 of a base station communication device in accordance with Embodiment 1, for deriving a weight on the tile-by-tile basis. It is noted that FIG. 5 shows two antenna elements 11a and 11b and circuits corresponding thereto as representatives.

Referring to FIG. 5, a receiving unit 1 of the base station communication device (radio communication device) includes: antenna elements 11a and 11b; pre-processing units 12a and 12b; CP (Cyclic Prefix) removing & DFT (Discrete Fourier Transform) units 13a and 13b; a SMI weight deriving unit 14; a weight multiplying & combining (weight multiplying unit and weight combining unit) 15; and a demodulating unit 16. SMI weight deriving unit 14 includes a correlation matrix calculating unit 14a, a correlation vector calculating unit 14b, in-tile pilot extracting units 14c and 14d, a pilot signal generating unit 14e, and a weight calculating unit 14f.

In OFDMA system, the transmitting side allocates data to be transmitted to subcarriers in the frequency domain, and the signals in the frequency domain are converted by IDFT (Inverse Discrete Fourier Transform) to time domain signals and transmitted.

Pre-processing units 12a and 12b perform pre-processing such as frequency conversion and A/D (Analog to Digital) conversion, on signals received by the plurality of antenna elements 11a and 11b, respectively. Specifically, pre-processing units 12a and 12b convert the received signals to discrete base-band signals.

CP removing & DFT units 13a and 13b remove CP of OFDM signals from the received signals that have been converted to base-band signals, and performs DFT thereon, whereby the received signals of the time domain are converted to signals of the frequency domain. The process up to DFT is performed in the system of each of antenna elements 11a and 11b.

The received signals of the frequency domain from CP removing & DFT units 13a and 13b are applied to SMI weight deriving unit 14 and weight multiplying & combining unit 15, which are functioning as an adaptive processor. SMI weight deriving unit 14 derives the weight for each antenna element, that is, a weight vector, on the tile-by-tile basis using pilot subcarriers included in the received signals.

Weight multiplying & combining unit 15 multiplies each data subcarrier included in the received signals of antenna elements 11a and 11b by the weight, respectively, to generate received signals multiplied by weights. The multiplication and combination are also performed on the tile-by-tile basis.

Demodulating unit 16 demodulates the combined received signals on the tile-by-tile basis.

SMI weight deriving unit 14 derives the SMI weight. Different from the LMS or RLS algorithm in which the optimal weight value is calculated through successive updating process, in SMI, the weight is directly calculated from the received signals and the known pilot signals, that is, reference signals. SMI is a kind of MMSE, capable of removing interference signal. Therefore, even if the received signals have much interference signal components, reception quality can be improved.

While the weight is derived on the tile-by-tile basis in the present embodiment, if successive updating process is done as in the case of LMS and RLS algorithms, weight updating must be repeated a number of times until the weight converges to the optimal value. Therefore, by the LMS and RLS algorithms, an appropriate weight cannot be derived if the number of available pilot subcarriers is small as in the case of deriving a weight on the tile-by-tile basis.

On the other hand, in SMI, the weight is directly calculated from the received signals and reference signals. Therefore, successive updating is unnecessary, and it has been found that an appropriate weight can be derived simply by using pilot subcarriers in the tile.

At receiving unit 1, SMI weight deriving unit 14 includes in-tile pilot extracting units 14ac and 14d for each system of antenna elements 11a and 11b, for extracting pilot subcarriers in each tile of the received signals.

By way of example, an in-tile pilot extracting unit of the system of N-th antenna element extracts four pilot subcarriers XNA, XNB, XNC and XND from signals XNm (m=A~D, 1~8) received by the N-th antenna elements, and generates a set of extracted signals {XNA, XNB, XNC, XND}.

The in-tile pilot extracting units of other antenna element systems also perform similar processes.

Since the SMI weight is calculated from correlation matrix and correlation vector, SMI weight deriving unit 14 includes correlation matrix calculating unit 14a and correlation vector calculating unit 14b.

The correlation matrix is calculated from a plurality of received signal vectors generated from each of the signals received by the plurality of antenna elements 11a and 11b. The received signal vectors XA, XB, XC and XD used for the calculation of correlation matrix are generated by extracting only the subcarriers corresponding to pilot subcarriers A, B, C and D from each tile of the received signals of antenna elements 11a and 11b.

Specifically, the received signal vector Xm (m=A, B, C, D) of each pilot subcarrier is represented by Equation (1) below. Here, T represents transposition. N represents the number of antenna elements.

[Equation 1]

$$X_m = [X_{1m}, X_{2m} \ldots X_{Nm}]^T (m=A,B,C,D) \text{:received signal vector} \quad (1)$$

Correlation matrix calculating unit 14a obtains the sets of pilot subcarriers {X1A, X1B, X1C, X1D}, ... {XNA, XNB, XNC, XND} (N is the number of antenna elements) of the same tile from in-tile pilot extracting units 14c and 14d of respective systems, and generates the received signal vector Xm given by Equation (1) above for each of the pilot subcarriers A, B, C and D in the tile.

Then, correlation matrix calculating unit 14a generates a correlation matrix R for calculating the weight of the corresponding tile, in accordance with Equation (2) below, from the received signal vector Xm. In Equation (2), E[ ] represents an expectation operation and H represents conjugate transpose.

[Equation 2]

$$R = E[X_m X_m^H] = \frac{1}{4} \sum_m X_m X_m^H \quad (m = A, B, C, D)\text{:correlated matrix} \quad (2)$$

Further, correlation vector calculating unit 14b also generates the received signal vector Xm of Equation (1) above, for each of pilot subcarriers A, B, C and D in the tile, based on the pilot subcarriers obtained from in-tile pilot extracting units 14c, 14d of respective systems, in the similar manner as correlation matrix calculating unit 14a. In Embodiment 1, the received signal vectors Xm are used as sample values for deriving the SMI weight of the corresponding tile.

Then, correlation vector calculating unit 14b calculates a correlation vector r for calculating the weight of the corresponding tile from the received signal vector Xm as the sample value and the known pilot signal Sm generated by pilot signal generating unit 14e, that is, the reference signal, in accordance with Equation (3) below. In Equation (3), * represents a complex conjugate.

[Equation 3]

$$r = E[X_m S_m^*] = \frac{1}{4}\sum_m X_m S_m^* \quad (m = A, B, C, D)\text{:correlation vector} \quad (3)$$

Weight calculating unit 14f calculates the SMI weight (weight vector) of the corresponding tile using the correlation matrix and the correlation vector calculated based on Equations (2) and (3). Weight calculating unit 14f calculates the SMI weight WSMI in accordance with Equation (4).

[Equation 4]

$$W_{SMI} = R^{-1} r \text{:SMI weight} \quad (4)$$

Weight multiplying & combining unit 15 calculates a combined output signal Ym in accordance with Equation (5), from the SMI weight vector WSMI and the received signal vectors Xm (m=1~8) of the data subcarriers in the tile. The data subcarrier to be multiplied by the weight is the data subcarrier included in the tile having the pilot subcarrier used for calculating the weight.

[Equation 5]

$$Y_m = W_{SMI}^H X_m (m=1,\ldots,8)\text{:combined output signal} \quad (5)$$

In the first embodiment, the process from deriving the weight to combining signals is performed on the tile-by-tile basis as described above and, therefore, the information regarding to which user the object tile belongs is unnecessary. Further, the process is facilitated by applying a common SMI weight to respective received signal vectors in the tile.

Though four pilot subcarriers in the tile are used for deriving a weight in the foregoing, only a part of the subcarriers, for example, two or three subcarriers, may be used.

Embodiment 2

Figure 6:
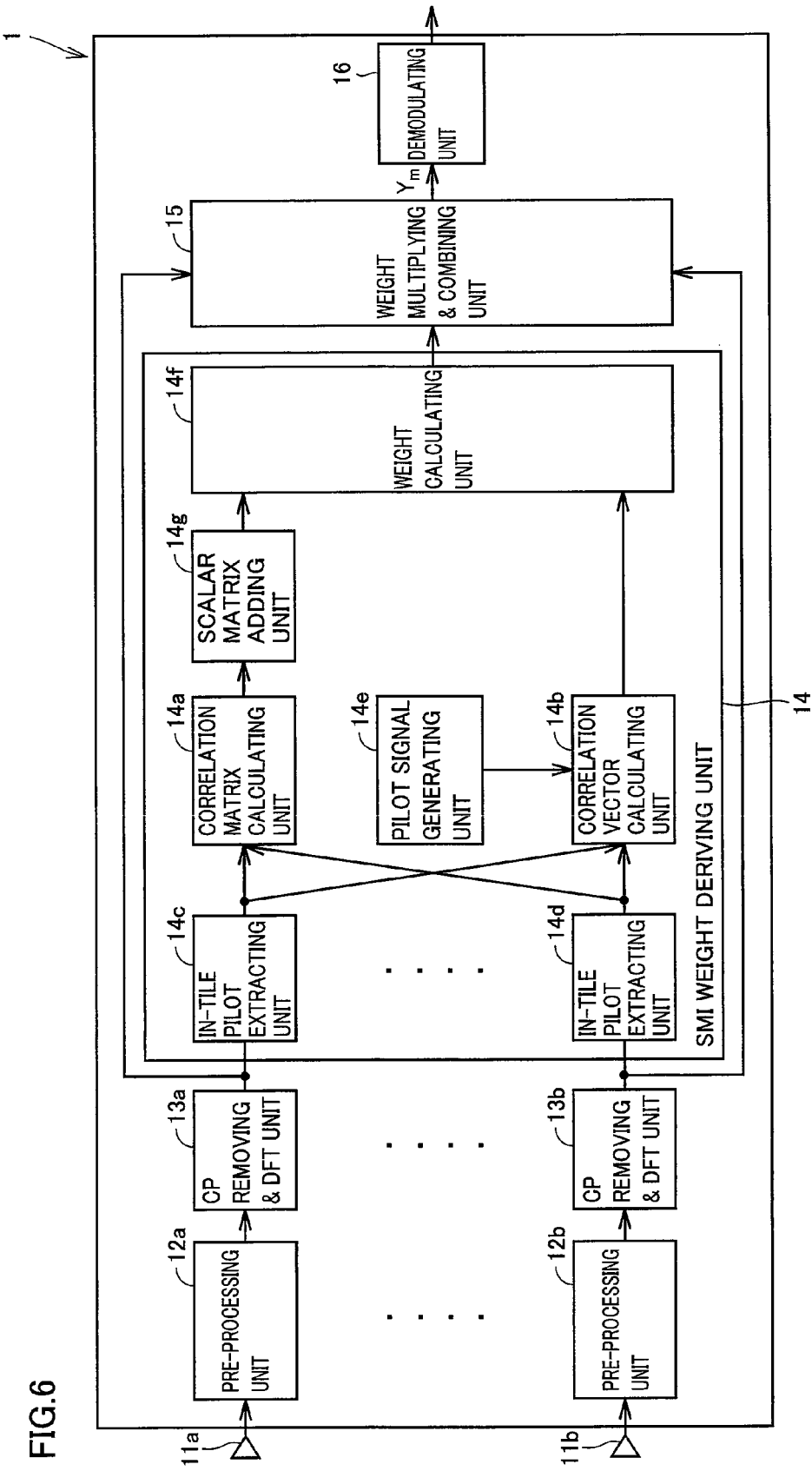
FIG. 6 is a block diagram of a receiving unit of a base station communication device in accordance with Embodiment 2.

FIG. 6 shows a receiving unit 1 of the base station communication device in accordance with Embodiment 2. Embodiment 2 differs from Embodiment 1 in that it additionally includes a diagonal matrix adding unit 14g.

Diagonal matrix adding unit 14g calculates a correlation matrix R', by adding, to a correlation matrix R calculated by correlation matrix calculating unit 14a, a diagonal matrix δI (I is a unit matrix, δ is a positive real number) having a diagonal component of an arbitrary magnitude with respect to the correlation matrix R, in accordance with Equation (6) below.

[Equation 6]

$$R' = R + \delta I \text{:correlation matrix} \quad (6)$$

Then, weight multiplying & combining unit 15 of Embodiment 2 calculates the SMI weight WSMI using the correlation matrix R' having the diagonal matrix 81 added, in accordance with Equation (7) below.

[Equation 7]

$$W_{SMI} = (R')^{-1} r \text{:SMI weight} \quad (7)$$

When the diagonal matrix of which diagonal component is a positive number is added to correlation matrix R as described above, the value of matrix necessary for calculating the inverse matrix of the correlation matrix which takes place in calculating the weight can be made larger to some extent. This prevents overflow at the time of digital signal processing and stabilizes operations. The magnitude of δ is preferably about a few % of the magnitude of correlation matrix R.

Other configurations and operations are the same as those of the base station communication device according to Embodiment 1 and, therefore, detailed description thereof will not be repeated here.

Embodiment 3

Figure 7:
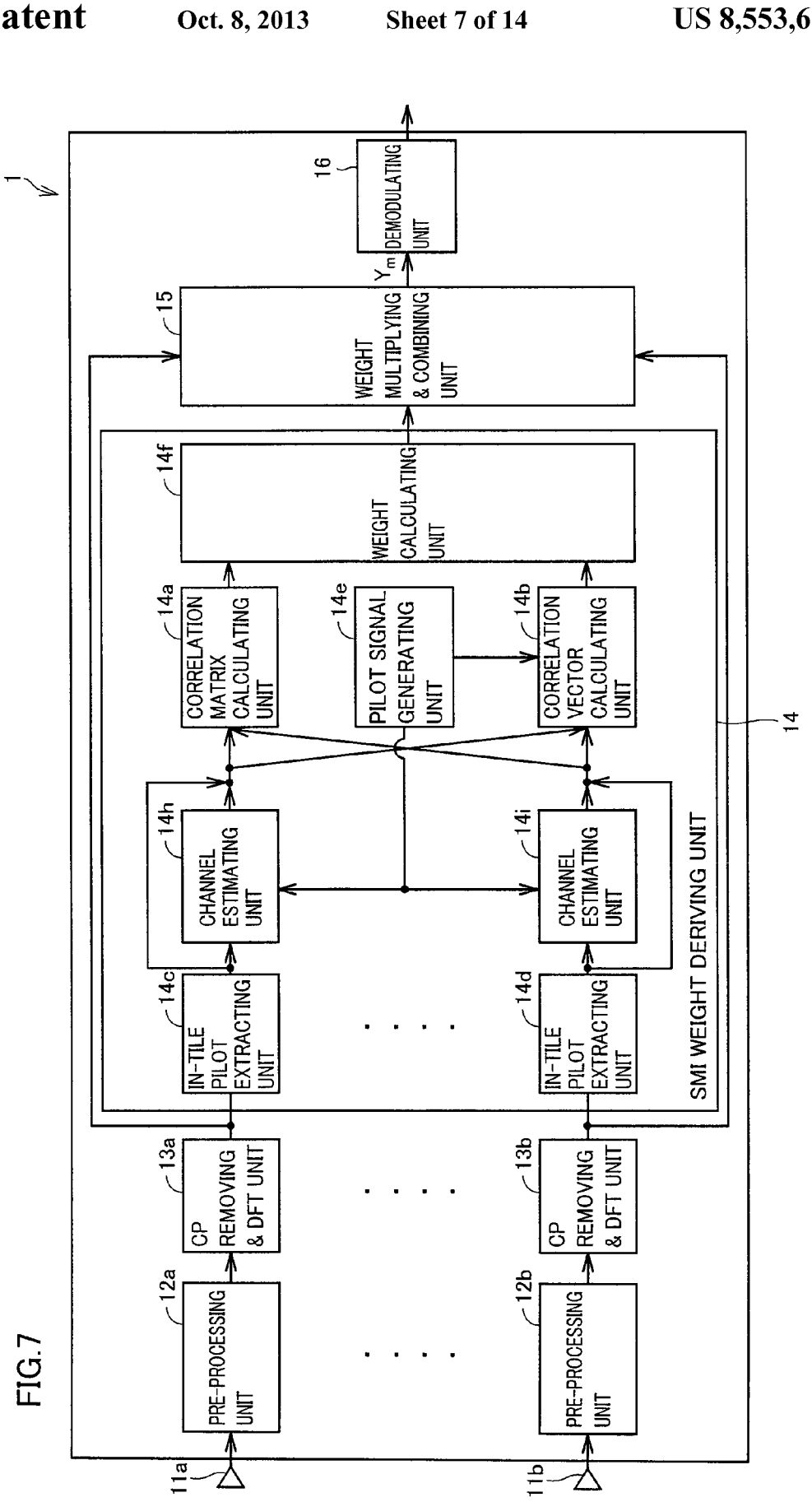
FIG. 7 is a block diagram of a receiving unit of a base station communication device in accordance with Embodiment 3.

FIG. 7 shows a receiving unit 1 of a base station communication device in accordance with Embodiment 3. Embodiment 3 differs from Embodiment 1 in that correlation matrix calculating unit 14a and correlation vector calculating unit 14b utilize not only pilot subcarriers A to D but also data subcarriers 1 to 8, as received signal vector Xm. In order to use the data subcarrier, SMI weight deriving unit 14 in accordance with Embodiment 3 includes, for the systems of antenna 11a and 11b, channel estimating units 14h and 14i.

The contents of processing by channel estimating units 14h and 14i are as follows. Specifically, channel estimating units 14h and 14i respectively calculate, from the pilot subcarriers extracted by in-tile pilot extracting units 14c and 14d and reference signal Sm generated by pilot signal generating unit 14e, a channel estimation value Hnm of the pilot subcarrier in accordance with Equation (8) below.

[Equation 8]

$$H_{nm} = \frac{X_{nm}}{S_m} \quad (n=1,\ldots,N)\ (m=A,B,C,D)\text{:channel estimation value} \quad (8)$$

Further, utilizing the channel estimation values Hnm (n=1, . . . , N) (m=A, B, C, D) of pilot subcarriers A to D, channel estimating units 14h and 14i calculate channel estimation values Hnm (n=1, . . . , N) (m=1, . . . , 8) of the data subcarriers, by an appropriate method of interpolation such as linear interpolation.

The channel estimation value Hnm (n=1, . . . , N) (m=1, . . . , 8) of the data subcarrier obtained by interpolation can be regarded as a received signal when "1" is transmitted as the transmission signal Sm.

Therefore, for data subcarriers 1 to 8, the received signal of data subcarrier when "1" is transmitted as the transmission signal Sm can be represented by Equation (9) below.

[Equation 9]

$$\hat{X}_{nm} = H_{nm}(n=1,\ldots,N)(m=1,\ldots,8) \quad (9)$$

Then, the received signal vector of data subcarriers 1 to 8 can be given by Equation (10) below.

[Equation 10]

$$\hat{X}_m = [\hat{X}_{1m}\hat{X}_{2m}\ldots\hat{X}_{Nm}]^T (m=1,\ldots,8) \quad (10)$$

Therefore, correlation matrix calculating unit 14a and correlation vector calculating unit 14b generate received signal vectors of data subcarriers 1 to 8, from channel estimation values Hnm (n=1, . . . , N) (m=1, . . . , 8) of data subcarriers obtained by channel estimating units 14h and 14i.

Then, correlation matrix calculating unit 14a and correlation vector calculating unit 14b calculate the correlation matrix and the correlation vector, from the received signal vectors of pilot subcarriers A to D and the received signal vectors of data subcarriers 1 to 8.

Equations for calculating the correlation matrix and the correlation vector utilizing all of twelve subcarriers including pilot subcarriers and data subcarriers in one tile are Equations

(11) and (12) below. Here, the pilot signal (reference signal) for data subcarriers 1 to 8 is "1".

[Equation 11]

$$R = E[X_m X_m^H + \hat{X}_m \hat{X}_m^H] \quad (11)$$
$$= \frac{1}{12}\left(\sum_m X_m X_m^H + \sum_m \hat{X}_m \hat{X}_m^H\right) : \text{correlation matrix}$$

[Equation 12]

$$r = E[X_m S_m^* + \hat{X}_m \hat{S}_m^*] \quad (12)$$
$$= \frac{1}{12}\left(\sum_m X_m S_m^* + \sum_m \hat{X}_m \hat{S}_m^*\right) : \text{correlation vector}$$

In Equations (11) and (12) above, a subscript m for the received signal vector of the pilot subcarrier assumes A to D, and a subscript m for the received signal vector of the data subcarrier assumes 1 to 8.

According to the method of Embodiment 3, the number of received signal vectors used as sample values increases and, if the accuracy (interpolation accuracy) of channel estimation value for the data subcarriers is high, the correlation matrix and the correlation vector come to have higher accuracy. As a result, the derived SMI weight also comes to have higher accuracy, and more appropriate combined output signal can be obtained.

In the foregoing, the channel estimation values of all of twelve data subcarriers in a tile are used. Not all but only some of channel estimation values of the data subcarriers in a tile may be used.

As to the received signal vectors as sample values, what is necessary is that a plurality of received signal vectors including a received signal vector of a pilot subcarrier and a received signal vector of a data subcarrier are available. Therefore, either the number of received signal vectors of the pilot subcarriers or the number of received signal vectors of the data subcarriers may be one.

Other configurations and operations are the same as those of the base station communication device according to Embodiment 1 and, therefore, detailed description thereof will not be repeated here.

Embodiment 4

Figure 8:
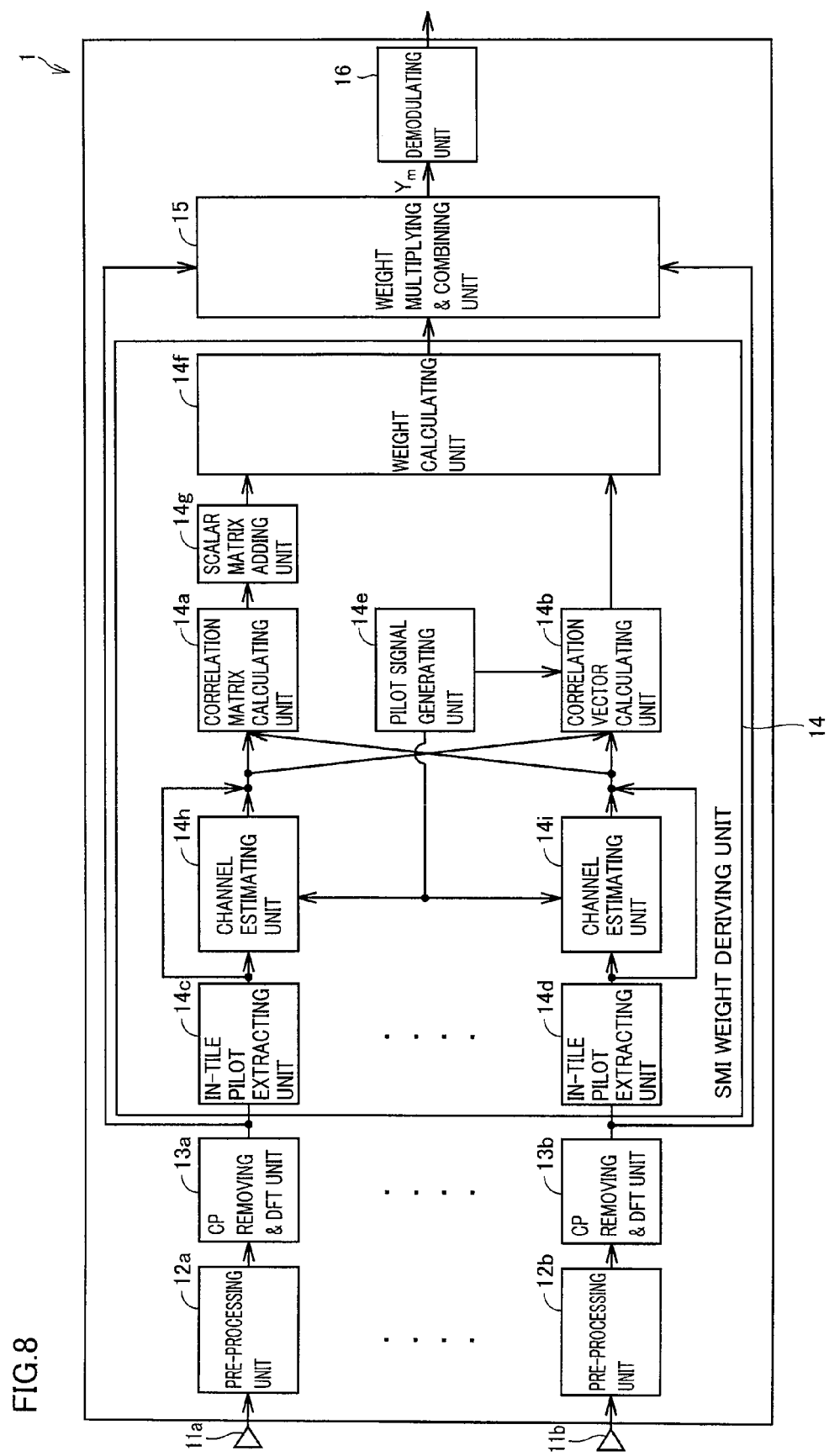
FIG. 8 is a block diagram of a receiving unit of a base station communication device in accordance with Embodiment 4.

FIG. 8 shows a receiving unit 1 of a base station communication device in accordance with Embodiment 4. In Embodiment 4, receiving unit 1 of the base station communication device in accordance with Embodiment 3 is additionally provided with diagonal matrix adding unit 14g in accordance with Embodiment 2 shown in FIG. 6. Except for this point, the embodiment is similar to other embodiments. Therefore, detailed description thereof will not be repeated here.

Embodiment 5

The basic configuration of receiving unit 1 of the receiving base station communication device in accordance with Embodiment 5 is the same as that of Embodiment 3 shown in FIG. 7. Therefore, Embodiment 5 will be described with reference to FIG. 7. It is noted, however, that in Embodiment 5, not a common weight WSMI is derived in one tile as in Embodiments 1 to 4 but weights W1SMI to W8SMI are derived individually for each of the data subcarriers 1 to 8 in the tile.

Figure 9:
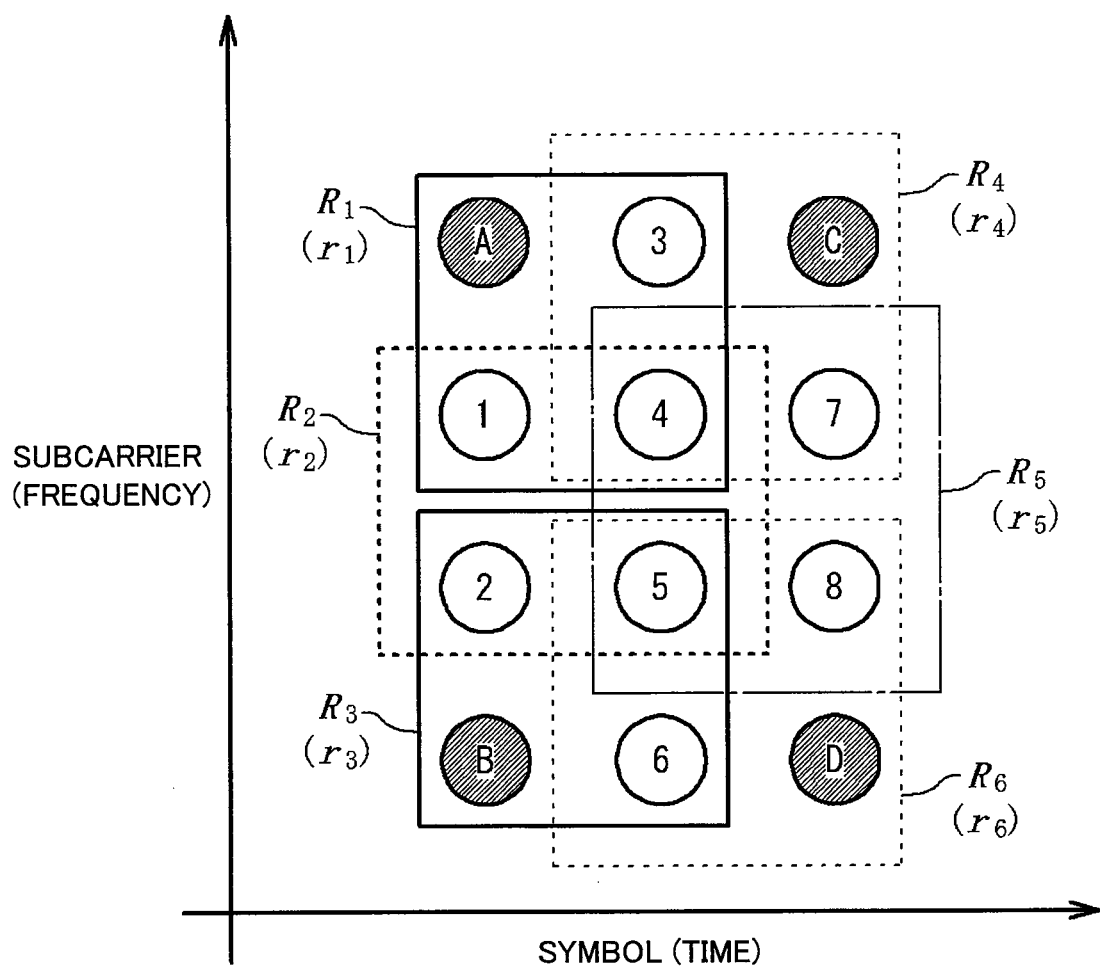
FIG. 9 shows small regions in a tile.

FIG. 9 shows small regions in a tile.

Correlation matrix calculating unit 14a and correlation vector calculating unit 14b in accordance with Embodiment 5 calculate not one correlation matrix and one correlation vector for an entire tile but calculate correlation matrixes R1 to R6 and correlation vectors r1 to r6 for a plurality of (six) small regions, respectively, in a tile (user allocated region), as shown by six rectangles in FIG. 9.

By way of example, correlation matrix calculating unit 14a and correlation vector calculating unit 14b calculate correlation matrix R1 and correlation vector r1 for the first small region, using received signal vector XA of pilot subcarrier A and received signal vectors X1, X3 and X4 of data subcarriers 1, 3 and 4 in the first small region. Similarly, correlation matrixes and correlation vectors are calculated for other small regions.

Though the small regions in the tile are set to partially overlap with each other as shown in FIG. 9, the size and the numbers thereof are not specifically limited. Further, the small regions may have different sizes.

FIG. 10 shows a correspondence table.

Weight calculating unit 14 calculates SMI weight WSMI for each of data subcarriers 1 to 8, based on the correspondence table shown in FIG. 10, using correlation matrixes R1 to R6 and correlation vectors r1 to r6 for respective small regions.

The correspondence table shown in FIG. 10 shows the sum of correlation matrixes and the sum of correlation vectors of one or a plurality of small region to which each data subcarrier in the tile belongs.

By way of example, referring to the table of FIG. 10, the correlation matrix of data subcarrier 1 is the "sum (R1+R2) of correlation matrix R1 of the first small region and correlation matrix R2 of the second small region." The reason for this is that data subcarrier 1 belongs to the first and second small regions in FIG. 9. Similarly, the correlation vector of data subcarrier 1 is (r1+r2).

Therefore, SMI weight W1SMI for data subcarrier 1 is calculated by inputting the correlation matrix (R1+R2) to R of Equation (4) and inputting the correlation vector (r1+r2) to r of Equation (4).

SMI weights W2SMI to W8SMI for other data subcarriers 2 to 8 are calculated in the similar manner.

Then, weight multiplying & combining unit 15 multiplies data subcarriers 1 to 8 by corresponding weights W1SMI to W8SMI, respectively, to provide a combined output signal.

According to Embodiment 5 above, each data subcarrier comes to have different received signal vector as the sample value. Since the received signal vector near each data subcarrier is used for deriving the weight, if the accuracy of channel estimation for the data subcarrier is high, the weight can be derived with high accuracy.

Other configurations and operations are the same as those of the base station communication device according to Embodiment 3 and, therefore, detailed description thereof will not be repeated here.

Embodiment 6

Figure 11:
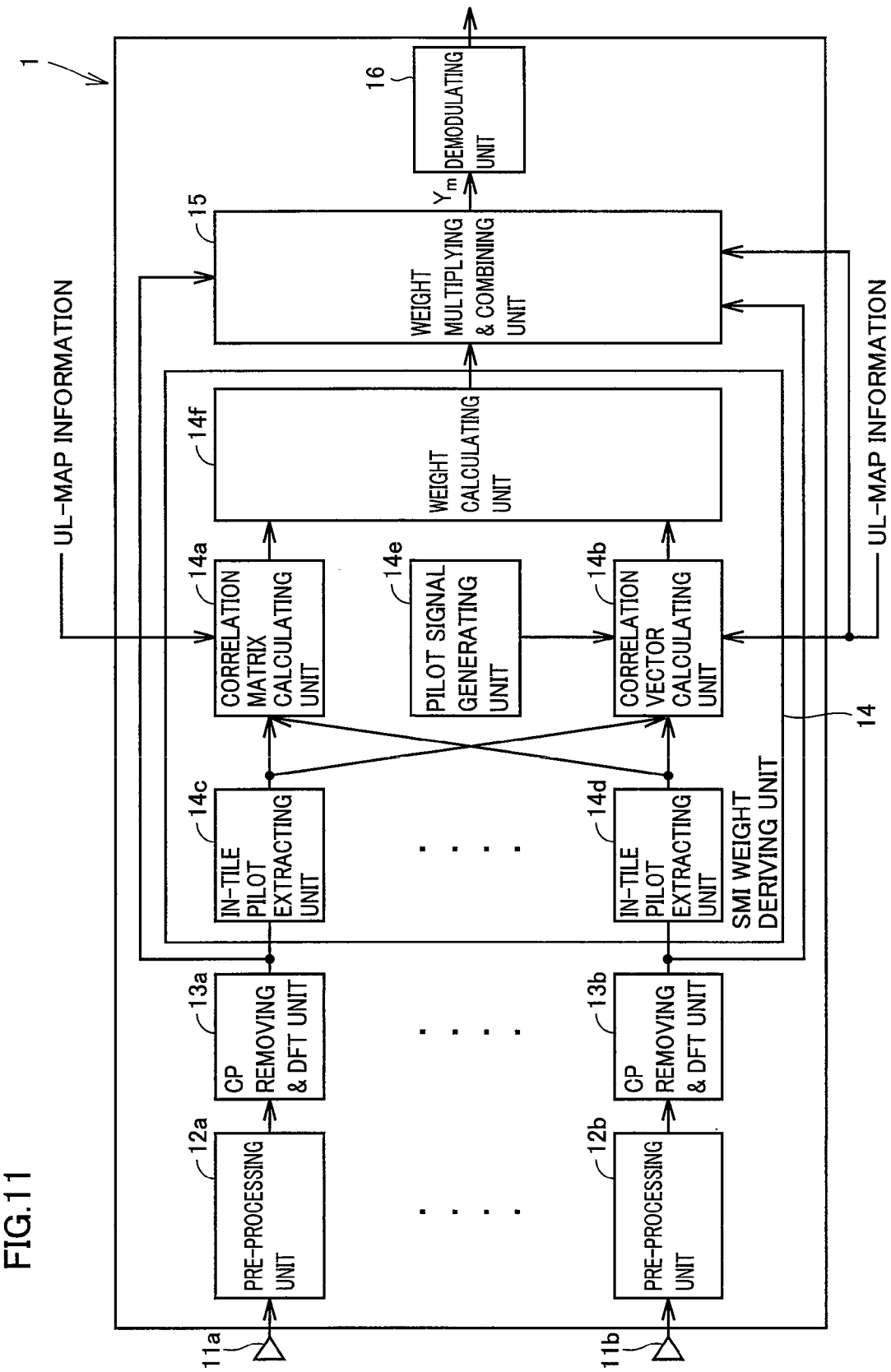
FIG. 11 is a block diagram of a receiving unit of a base station communication device in accordance with Embodiment 6.

FIG. 11 shows a receiving unit 1 of a base station communication device in accordance with Embodiment 6. In Embodiment 6, not the tile as the minimum unit region of user allocation, that is, a part of the user allocation region, but each user allocation region as a whole is used as the unit for deriving the SMI weight.

For this purpose, to correlation matrix calculating unit 14*a*, correlation vector calculating unit 14*b* and weight multiplying & combining unit 15, UL-MAP (UpLink-MAP) information is applied as user allocation information. The UL-MAP information is generated by the base station communication device, for notifying the allocated region to all mobile stations through a down link, that is, a down frame. Using the UL-MAP information, receiving unit 1 of the base station communication device knows which burst region of the up frame is allocated to which user, generates the SMI weight for each burst region, and performs weight multiplication and combining operations.

The UL-MAP information may be used not only when the entire user allocated region is used as a unit for deriving the SMI weight but also when a part of the user allocated region is used as the unit for deriving the SMI weight with the part being larger than the minimum unit region of user allocation, in order to define the range of one user.

Though FIG. 11 shows a basic configuration similar to that of receiving unit 1 of the base station communication device in accordance with Embodiment 1 shown in FIG. 5, the concept of Embodiment 6 is also applicable to the configurations of Embodiments 2 to 4.

[Simulation Results]

Figure 12:
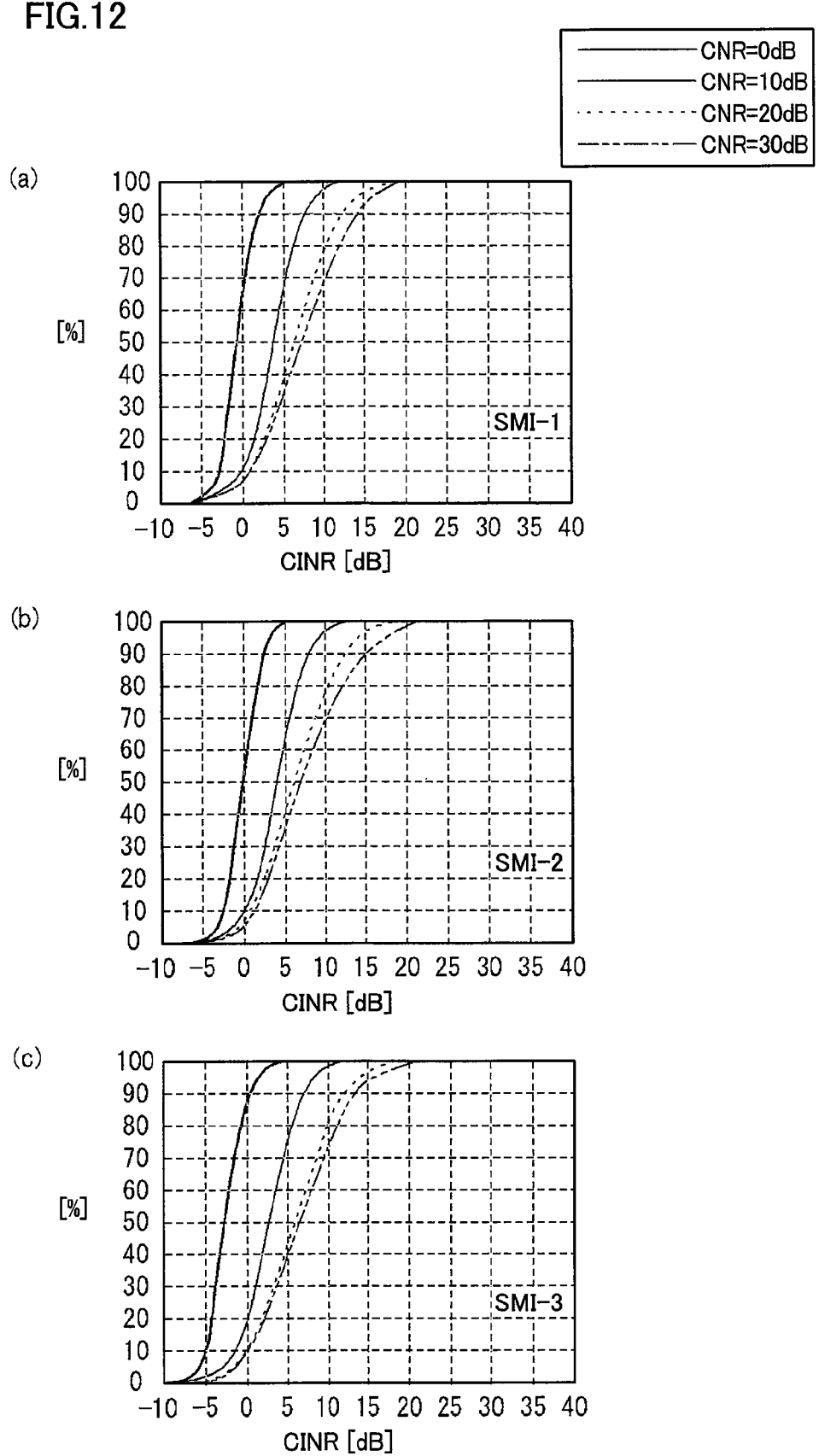
FIG. 12 shows simulation results.

FIGS. 12(*a*) to (*c*) and FIGS. 13(*a*) to (*c*) show simulation results comparing performances of Embodiment 3 (hereinafter denoted as "SMI-1") using all twelve subcarriers in a tile as sample values of received signal vectors, Embodiment 1 (hereinafter denoted as "SMI-2") using four pilot subcarriers in a tile as sample values of received signal vectors, and Embodiment 5 (hereinafter denoted as "SMI-3") in which the weight is derived for each data subcarrier.

Figure 13:
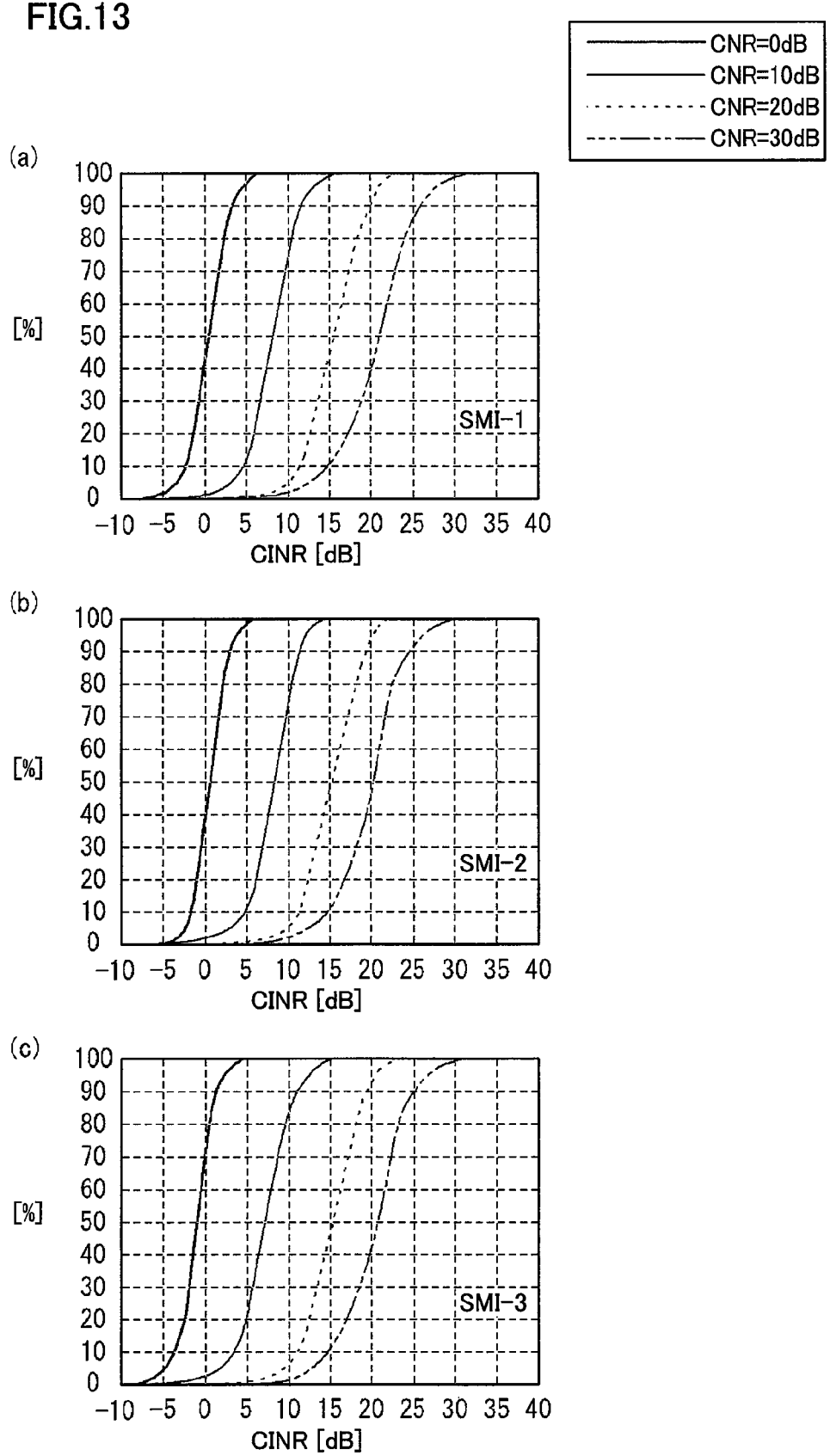
FIG. 13 shows simulation results.

In the simulation results shown in FIGS. 12(*a*) to (*c*) and FIGS. 13(*a*) to (*c*), comparison is based on CINR (Carrier-to-Interference-plus-Noise Ratio) distribution of the combined output signals with CNR (Carrier-to-Noise Ratio) and CIR (Carrier-to-Interference Ratio) varied, for each of SMI-1, SMI-2 and SMI-3 methods.

Parameters used for the simulation are as follows:
CNR: 0 [dB], 10 [dB], 20 [dB], 30 [dB]
CIR: 0 [dB], 20 [dB]
Slot number: 10,000 (=60,000 tiles)
Data subcarrier modulation method: QPSK (Quadrature Phase Shift Keying)

It is assumed that low speed (for example, 30 km/h) and high speed (for example, 120 km/h) mobile stations exist in mixed manner.

FIGS. 12(*a*) to (*c*) and FIGS. 13(*a*) to (*c*) show cumulative distribution function of CINR, with the abscissa representing CINR and the ordinate representing possibility that the combined output signal becomes lower than the CINR.

FIG. 12 shows an example in which CIR=0 [dB], that is, the desired signal and the interference signal have the same magnitude. Here, difference appears among the methods when CNR is bad (CNR=0 [dB]).

Specifically, SMI-2 shown in FIG. 12(*b*) has the best characteristics, followed by SMI-1 shown in FIG. 12(*a*), and SMI-3 shown in FIG. 12(*c*) is the worst.

If there is significant interference signal, interpolation accuracy of channel estimation for the data subcarriers decreases and, therefore, SMI-2 exhibits good characteristics since it uses only the received signal vectors of pilot subcarriers as sample values.

FIGS. 13(*a*) to (*c*) show results when CIR=20 [dB], the desired signal is larger than the interference signal and the accuracy of channel estimation for the data subcarriers is low. Here, as in FIG. 12, SMI-2 shown in FIG. 13(*b*) has the best characteristics, followed by SMI-1 shown in FIG. 13(*a*), and SMI-3 shown in FIG. 13(*c*) is the worst.

Figure 14:
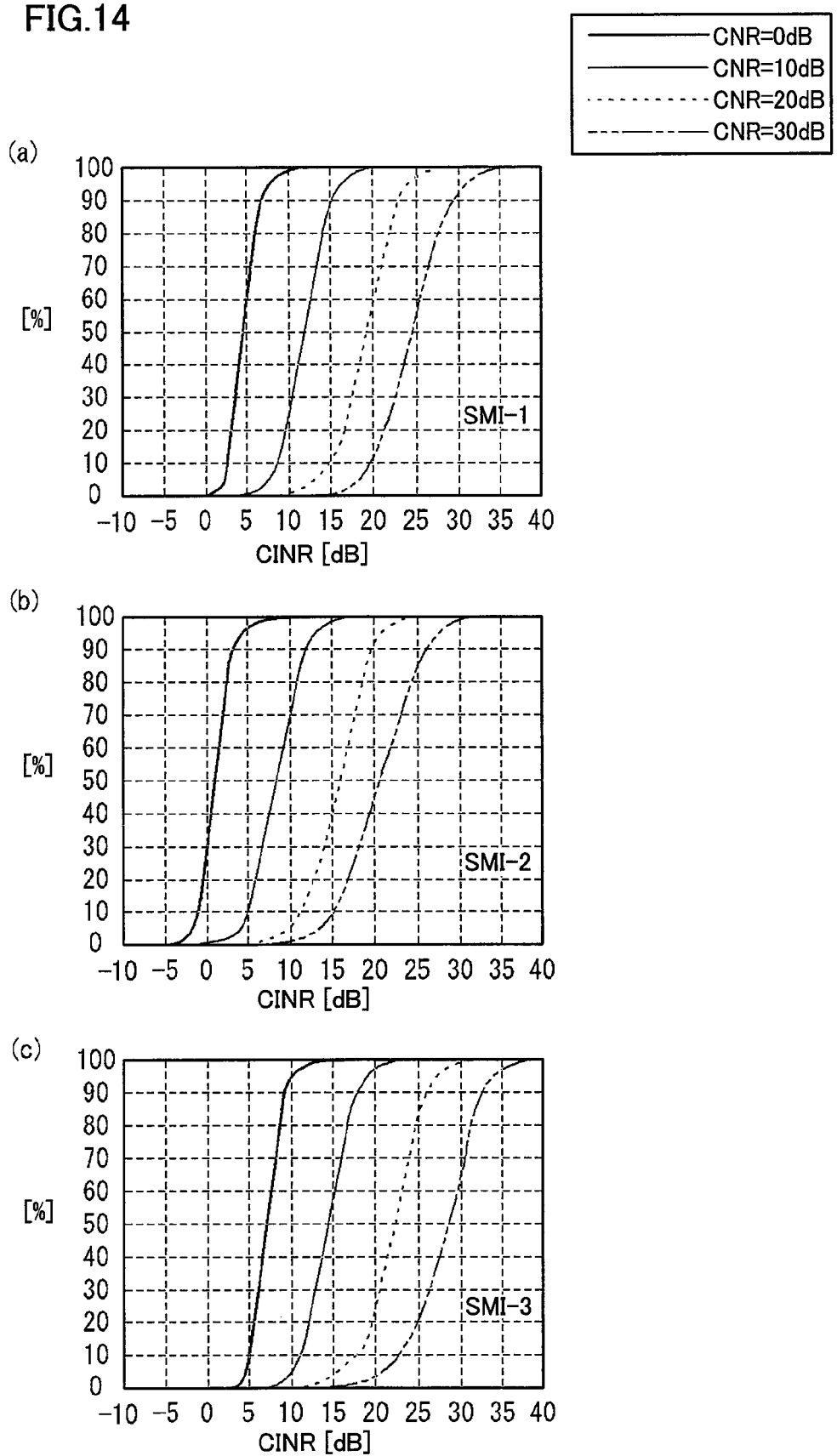
FIG. 14 shows simulation results.

FIGS. 14(*a*) to 14(*c*) show examples in which CIR=20 [dB] and the accuracy of channel estimation for the data subcarriers is high. Here, SMI-3 shown in FIG. 14(*c*) has the best characteristics, followed by SMI-1 shown in FIG. 14(*a*), and SMI-2 shown in FIG. 14(*b*) is the worst.

As shown in FIG. 14, if the accuracy of channel estimation is high, characteristics of SMI-1 and SMI-3 using received signal vectors of data subcarriers are improved and, particularly, SMI-3 in which the weight is derived for each data subcarrier exhibits superior characteristics.

The present invention is not limited to the embodiments described above and various modifications may be made without departing from the scope of the present invention. For instance, the minimum unit of user allocation is not limited to the tile shown in FIG. 3 and it may be a cluster of DL PUSC.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A radio communication device for performing radio communication using OFDMA (Orthogonal Frequency Division Multiple Access) system, in which a plurality of user allocated regions are allocated to multiple users at a same time, the device comprising:
    a SMI (Sample Matrix Inversion) weight deriving unit for calculating a correlation matrix and a correlation vector using a plurality of received signal vectors as sample values, and deriving a SMI weight based on said calculated correlation matrix and correlation vector; and
    a weight multiplying unit for multiplying said received signal vector by the SMI weight derived by said SMI weight deriving unit to extract a desired signal,
    wherein said SMI weight deriving unit uses the plurality of received signal vectors included in one user allocated region among the plurality of user allocated regions in the OFDMA system as a sample value, the one user allocated region being a part or an whole of a region allocated for one user, the plurality of received signal vectors including received signal vectors of respectively different subcarriers, discontinuous in time, and thereby derives the SMI weight for said user allocated region, wherein multiple users access the allocated regions at a same time.

2. A radio communication device for performing radio communication using OFDMA (Orthogonal Frequency Division Multiple Access) system, in which a plurality of user allocated regions are allocated to multiple users at a same time, the device comprising:
    a SMI (Sample Matrix Inversion) weight deriving unit for calculating a correlation matrix and a correlation vector using a plurality of received signal vectors as sample values, and deriving a SMI weight based on said calculated correlation matrix and correlation vector; and
    a weight multiplying unit for multiplying said received signal vector by the SMI weight derived by said SMI weight deriving unit to extract a desired signal,
    wherein said SMI weight deriving unit uses the plurality of received signal vectors included in a minimum unit region allocated for one user of the multiple users of radio resource as a sample value, the plurality of received signal vectors including received signal vectors of respectively different subcarriers, discontinuous in time, and thereby derives the SMI weight for said minimum unit region, wherein multiple users access the allocated regions at a same time.

3. The radio communication device according to claim 2, wherein
subcarrier arrangement in the OFDMA system is a two-dimensional arrangement in frequency axis direction and time axis direction; and
each of minimum unit regions is allocated to a user different from a user allocated to another minimum unit region adjacent to in the frequency axis direction and different from a user allocated to another minimum unit region adjacent in the time axis direction.

4. The radio communication device according to claim 2, wherein
said SMI weight deriving unit includes a diagonal matrix adding unit adding a diagonal matrix whose diagonal component is a positive number to said calculated correlation matrix; and
said SMI weight deriving unit derives said SMI weight based on the correlation matrix having said diagonal matrix added.

5. The radio communication device according to claim 2, wherein
said sample value includes a received signal vector of a pilot subcarrier included in said minimum unit region.

6. The radio communication device according to claim 2, wherein
said SMI weight deriving unit includes a channel estimating unit for calculating a channel estimation value of a data subcarrier included in said minimum unit region, based on a pilot subcarrier included in said minimum unit region; and
said SMI weight deriving unit generates the received signal vector of said data subcarrier based on the channel estimation value calculated by said channel estimating unit, and derives said SMI weight based on a sample value including said generated received signal vector of the data subcarrier.

7. The radio communication device according to claim 6, wherein
said SMI weight deriving unit derives said SMI weight, using
a received signal vector of a pilot subcarrier included in said minimum unit region, and the received signal vector, which is generated based on said channel estimation value, of data subcarrier, as said sample values.

8. The radio communication device according to claim 6, wherein
said SMI weight deriving unit derives a SMI weight for each data subcarrier included in said minimum unit region.

9. The radio communication device according to claim 8, wherein
said SMI weight deriving unit includes a correlation matrix calculating unit, regarding said minimum unit region as a set of a plurality of small regions partially overlapping with each other, for calculating said correlation matrix for each said small region, using a received signal vector of a pilot subcarrier or a received signal vector of a data subcarrier included in said small region as a sample value; and
said SMI weight deriving unit derives said SMI weight based on said correlation matrix or matrixes corresponding to one or a plurality of said small regions to which a data subcarrier of which said SMI weight is to be derived belongs, among the correlation matrixes of respective ones of said small regions calculated by said correlation matrix calculating unit.

10. The radio communication device according to claim 8, wherein
said SMI weight deriving unit includes a correlation vector calculating unit, regarding said minimum unit region as a set of a plurality of small regions partially overlapping with each other, for calculating said correlation vector for each said small region, using a received signal vector of a pilot subcarrier or a received signal vector of a data subcarrier included in said small region as a sample value; and
said SMI weight deriving unit derives said SMI weight based on said correlation vector or vectors corresponding to one or a plurality of said small regions to which a data subcarrier of which said SMI weight is to be derived belongs, among the correlation vectors of respective ones of said small regions calculated by said correlation vector calculating unit.

11. A radio communication device for performing radio communication using a communication system, wherein allocation regions of a radio resource, which are allocated to multiple users, respectively, are arranged in frequency axis direction and time axis direction, whereby the radio resource can be shared among a plurality of users at a same time, the device comprising:
a weight deriving unit for deriving a weight for each allocation region of the radio resource from received signals of a plurality of subcarriers included in the allocation region of the radio resource; and
a weight multiplying unit for multiplying the derived weight by a received signal vector included in the allocation region of the radio resource corresponding to the derived weight to extract a desired signal,
wherein multiple users access the allocation regions at a same time.

12. The radio communication device according to claim 11, wherein said weight is a MMSE Minimum Mean Square Error) weight.

13. The radio communication device according to claim 12, wherein said weight is a SMI weight.

14. The radio communication device according to claim 11, wherein said communication system is WiMAX.

15. The radio communication device according to claim 14, wherein said minimum unit regions are tiles in WiMAX.

* * * * *